2,916,412
METHOD OF DEINKING WASTE PAPER

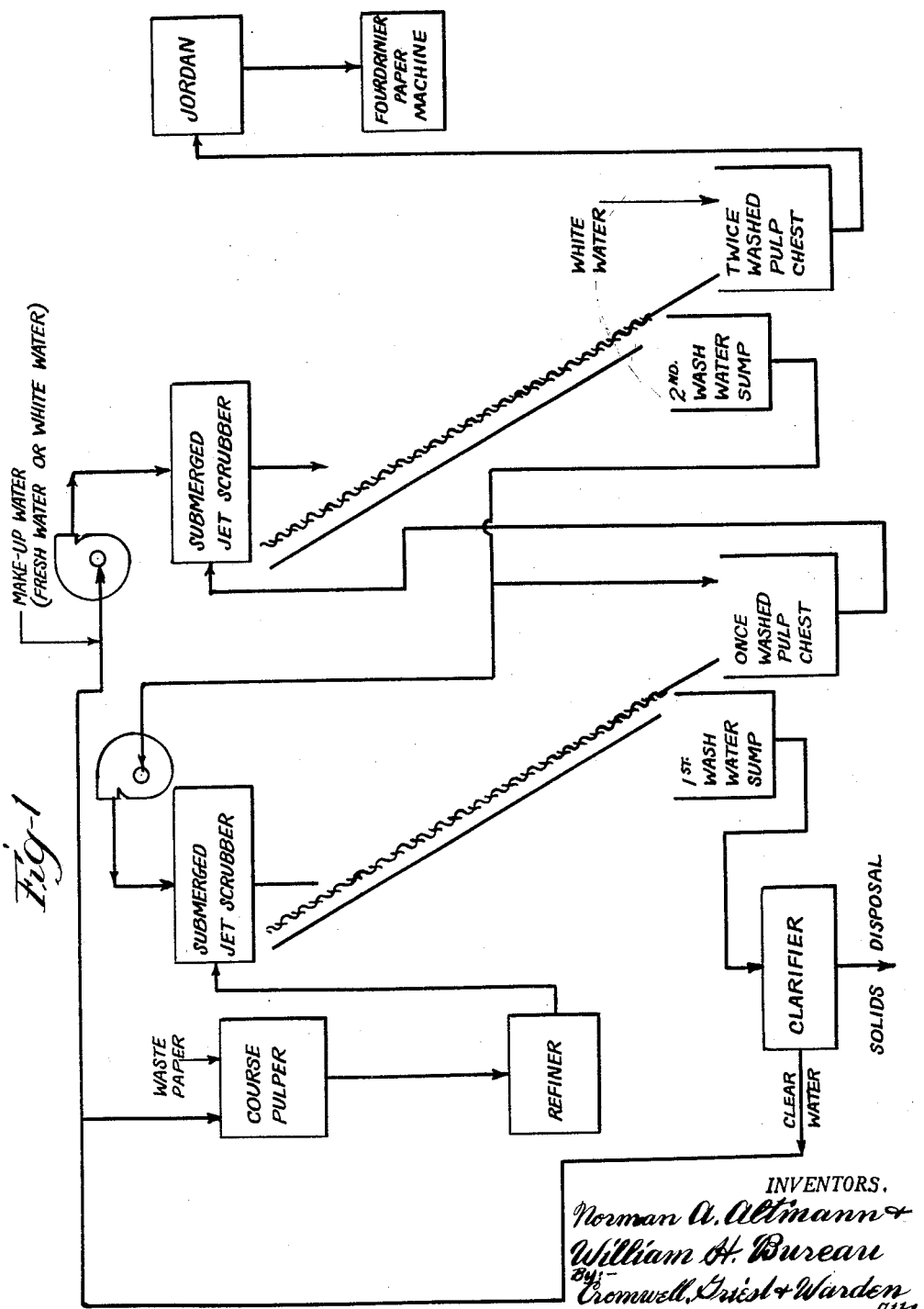

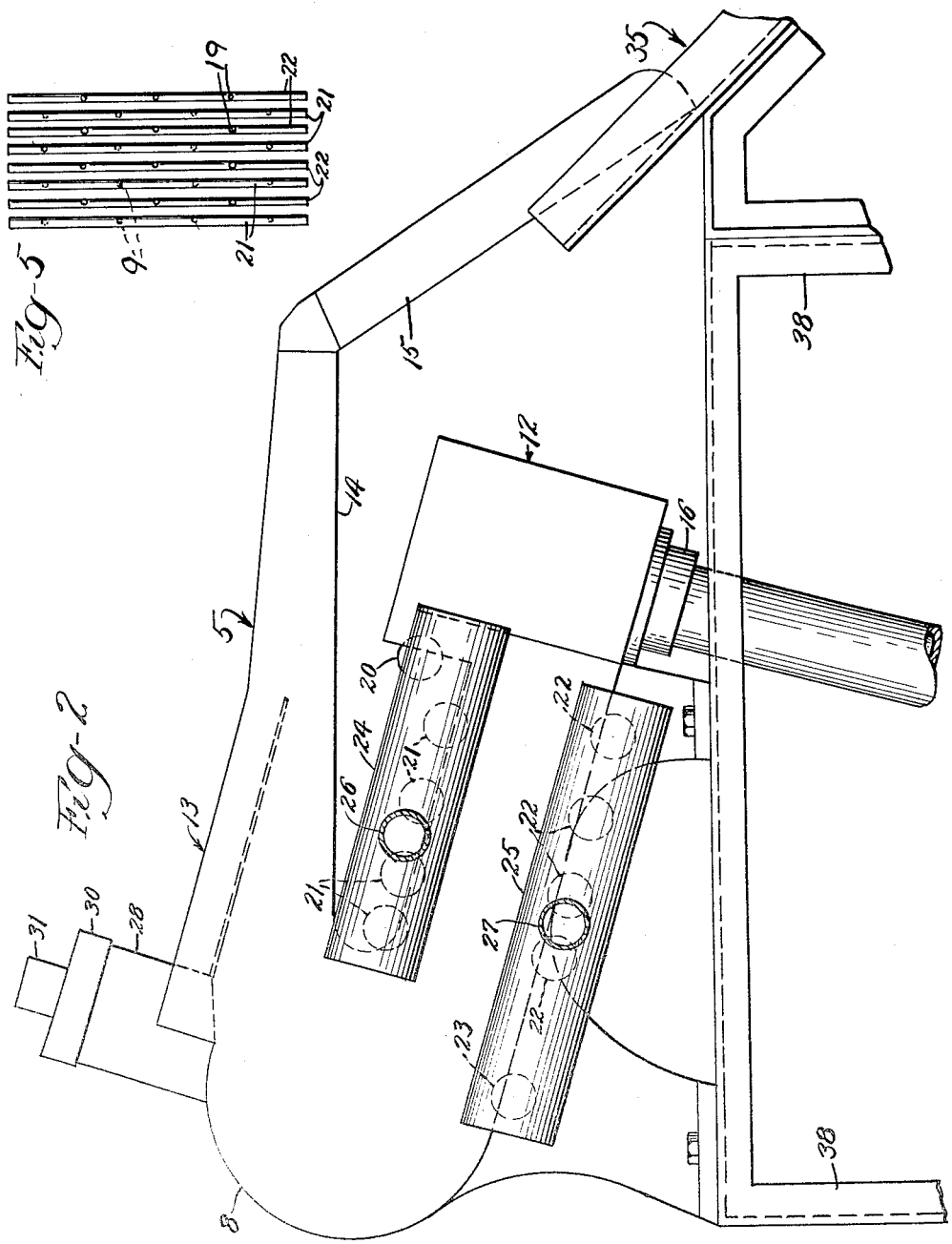

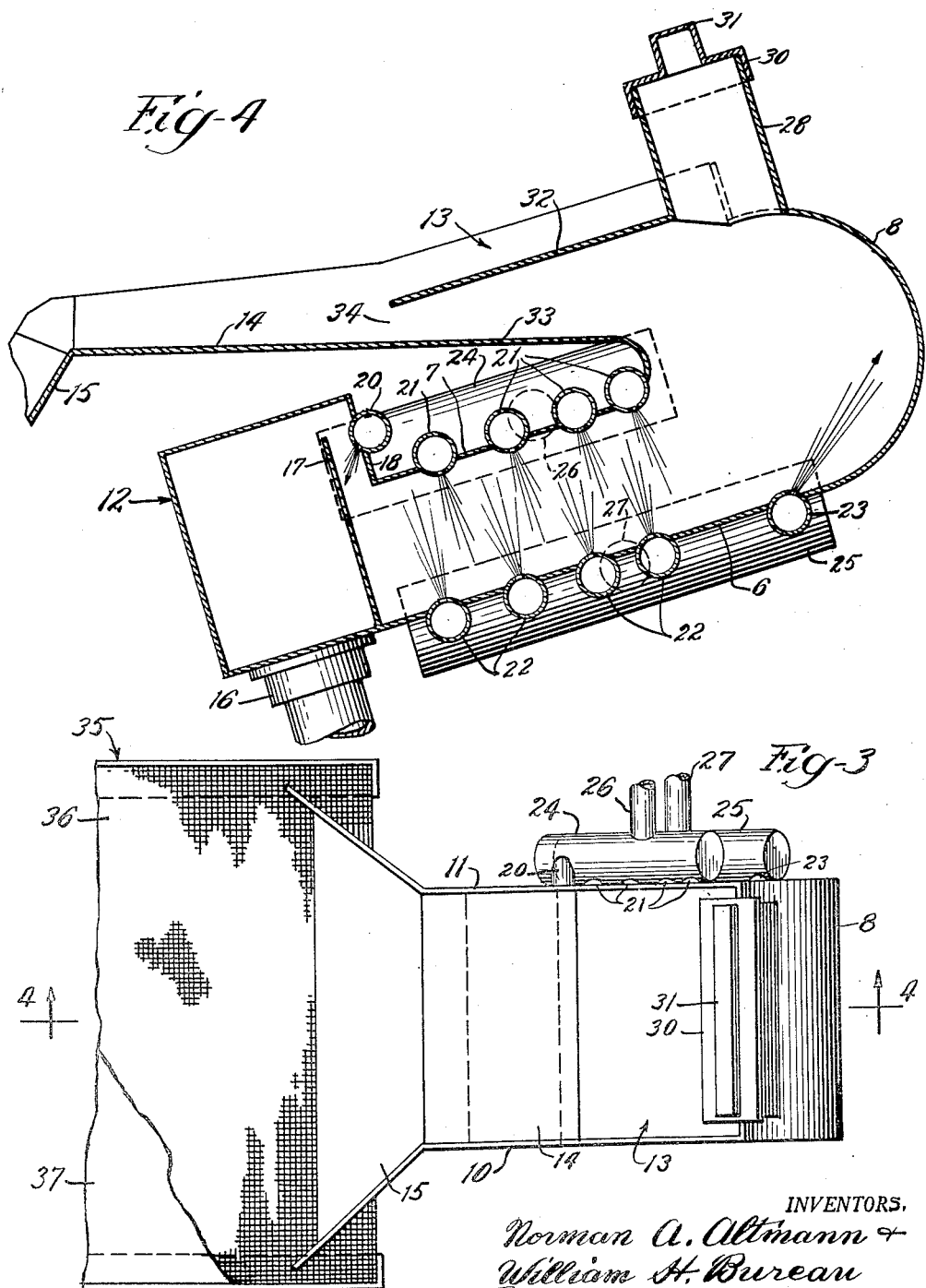

Norman A. Altmann, Wilmette, and William H. Bureau, Glen Ellyn, Ill., assignors to Butler Company, Chicago, Ill., a corporation of Illinois Application November 17, 1953, Serial No. 392,582

5 Claims. (Cl. 162—4)

This invention relates to a method of, and apparatus for, deinking waste paper in cool or cold water without the use of deinking chemicals so as to reclaim a large percentage of the fiber content thereof as clean pulp suitable for reuse in paper-making. The method of the invention is a physico-hydrokinetic deinking method.

The methods of deinking and reclaiming waste paper which were used in the past with some success involved the cooking of the waste stock in various deinking chemicals. Such methods were reasonably satisfactory and adequate a number of years ago when there was no need to deink and reclaim newsprint and the balance of the waste paper did not contain groundwood, and when paper was printed with simple and fairly standard inks that were readily removed or saponified with chemicals at elevated temperature.

In recent years such former methods of deinking involving cooking and the use of chemicals have become increasingly unsatisfactory for a number of reasons. Ink formulations have become more and more complicated and involve increasing use of a wide variety of synthetic resins and plasticizers with each ink house having its own special formulations. Also, increasing amounts of synthetic resins and plasticizers are being used in a wide variety of sizings and coatings. Furthermore, multi-color printing and multi-color advertisements have become increasingly important in recent years and these involve a wide variety of new ink formulations, many of which incorporate new pigments, dyes and toners which are adversely affected by various deinking chemicals.

The former methods of deinking and reclaiming waste paper by the use of chemicals and cooking procedures are therefore not adapted or adequate for removing these new types of ink and coating formulations. Due to their high content of thermoplastic resins, the softening action of the heat and chemicals alone makes the separation from the fibers very difficult. Furthermore, the action of the heat and chemicals even tends to irreversibly set and more firmly bond to the fibers some of the present-day pigments, and to fix dyes and toners to the fibers through staining.

Because of the fact that such a wide variety of printing and coating formulations is now in use, it has become impractical to design a chemical deinking process which will be useful on any broad scale. In this connection, it should be noted that it is not economically practical to identify, sort or classify waste paper much, if any, beyond separating old newsprint from old magazines.

In addition to the above difficulties and complications, the various State and Federal authorities have become increasingly rigid with respect to stream pollution and the conservation of fish and animal life, so that it is an ever-increasing problem to find a satisfactory way of disposing of deinking chemicals and wastes.

The picture is even further complicated by the fact that it has become more and more necessary, as the nation's timber reserves are depleted, to use and increase the groundwood (i.e. whole wood) content of magazine and similar types of paper. Deinking chemicals act on the groundwood content to darken it so that extensive bleaching becomes necessary, whereupon the groundwood content is burned out and the resulting shrinkage or weight loss is so severe that it cannot normally be tolerated.

For these and other reasons it will be seen that the deinking and reclaiming processes for waste paper which were in use 20 to 25 years ago are no longer satisfactory or adequate.

While prior deinking and reclaiming processes have, on the one hand, become less and less satisfactory for deinking and reclaiming waste paper because of technological changes and advances in the papermaking art, the need for a satisfactory deinking and reclaiming process has, on the other hand, become increasingly important due to the greatly expanded utilization of paper and the depletion of the nation's timber reserves. The recent creation of a special congressional sub-committee for the purpose of investigating the critical shortage of groundwood for newsprint and to promote ways and means for solving the shortage serves as an indication of the great importance of the problem and the grave need for a practical solution thereof.

In accordance with our present invention, we have discovered and developed a non-chemical method of deinking and reclaiming waste paper which has been successfully tested and reduced to practice and which will withstand a critical cost analysis and engineering evaluation. While the new process works very well with the old linseed oil base printing inks, it works even better with the present-day resinous or plastic-base printing inks, which are normally considered to be very difficult to deal with as explained above. The equipment necessary to carry out the process is for the most part already available commercially and the novel apparatus which is involved can be made commercially without difficulty. Since no chemicals are used, there is no problem of stream pollution due to disposal of spent or waste deinking chemicals.

Water is the only material, other than waste paper, required to carry out the process and the existing supply of water at a paper mill will normally be more than adequate. If the water supply is critical at any particular mill, the deinking method can be adapted to a "bottled-up" or re-circulatory type process so that most of the water can be repeatedly used over and over again with only very little fresh water being required. The process is capable of handling waste paper of all types regardless of its groundwood content and including newsprint, and regardless of the types of inks, sizing materials, fillers, coatings, dyes, toners, pigments, etc. that may have been used on the papers. The process is very flexible and the deinked and reclaimed stock can either be used as the entire furnish for making finished paper or the reclaimed and deinked stock may be used as an extender in the furnish for various types of paper.

The deinking process of the present invention may be adapted to the manufacture of conventional types and grades of paper such as newsprint (including colored news), novel news, hanging stock, paperboard, book paper, mimeograph paper, magazine paper, catalog paper, rotogravure paper, offset paper, coating raw stock, etc. The process and apparatus may be used in the manufacture of other grades of paper and also paper specialties, such as paper toweling, paper napkins, tissue papers, and molded pulp articles of all types, such as egg cartons. The resulting paper or paper products may be printed, coated, sized or otherwise treated in accordance with any of the various known commercial procedures.

The process may be carried out to a considerable extent in and with apparatus which is already available in paper mills and therefore very little additional investment is required for new equipment or increased space in order to install and operate the process in an existing mill. Furthermore, the process may be carried out by the ordinary paper mill staff and personnel after suitable preliminary instruction.

In addition to being able to employ the process of the present invention to the manufacture of known commercial grades of paper, it has been found that paper having somewhat unique physical characteristics may be manufactured in accordance with the invention. Thus, it is possible to manufacture by the process and apparatus of this invention paper stock which has unusual dimensional stability and inertness to ambient temperature and humidity so that it remains free from curl and distortion over a wide range of these conditions. Evidently, these unique properties result from the particular treatment to which the waste paper is subjected during the reclaiming and deinking process and from the fact that the fibers are subjected to very little hydration and no chemical action.

Paper produced from the deinked and reclaimed pulp manufactured according to the invention has outstanding opacity, resiliency and high bulk.

In carrying out the present deinking and reclaiming process, the waste paper is first broken or coarsely pulped in a suitable piece of fiberizing equipment. The coarsely pulped stock is then introduced at a temperature not substantially in excess of about room temperature or 70° F. into a high-speed revolving disk refiner wherein the coarse pulp is disintegrated and defibered in a matter of seconds and the heat generated produces a temperature rise which may be as much as 20–30° F. This disintegrating and defibering step constitutes one important feature of the invention and is combined with the step of washing or scrubbing the pulp at a relatively low consistency with submerged jets of wash water. A high-speed revolving disk type refiner such as a Bauer fibrator, a Sutherland refiner or a Sprout-Waldron rotary-disk refiner may be used for the first step. This type of high-speed revolving disk refiners is described, for example, in U.S. Patent No. 1,744,226, dated January 21, 1930, and U.S. Patent No. 2,568,783, dated September 25, 1951. In this type of a refiner the disintegrating or defibering action is carried out between a pair of disks, at least one of which is driven so as to rotate at high speed relative to the other. The two disks carry serrations in their opposing surfaces and, preferably, both disks are driven at high speeds and in opposite directions. For example, the disks may be driven at speeds of approximately 900 r.p.m., thus achieving a relative speed of 314 ft./sec. between 40" revolving disks at their peripheries. The pulp is fed into such a refiner between the centers of the opposing disks and is centrifugally discharged at the periphery of the combination whereat it is first subjected to a very efficient and intensive disintegrating or defibering action in which the ink particles are shattered and loosened from the fibers. This action is peculiar to this particular process since it does not destroy or materially weaken the individual fibers but it does serve to shatter off or loosen ink and pigment particles with very little hydration. The time and temperature relationship involved in passing the waste paper pulp through such a refiner is of great importance to the success of the present process.

After passing through one of these revolving disk refiners or a piece of equipment which functions in substantially the same manner to shatter off or loosen the ink particles, the disintegrated and defibered waste paper pulp is intensively scrubbed or washed so as to free the fibers of ink and pigment particles thereon. This washing operation is preferably carried out in an efficient submerged jet scrubber or washer of a novel construction wherein the pulp is de-flocculated and subjected to the repeated cleansing and scrubbing action of high-speed, high-pressure submerged water jets. Preferably, the defibered and disintegrated pulp is subjected to two of such washing operations with the washed pulp being dewatered after each washing step so as to remove the particles of ink and any other free impurities. The resulting product will be a pulp which is substantially entirely free of all ink and pigment particles as well as any other loose foreign bodies.

The object of this invention, generally stated, is a physico-hydrokinetic process and apparatus for deinking and reclaiming waste paper which does not involve the use of deinking chemicals. The expression "physico-hydrokinetic" is used advisedly in describing the invention to indicate that the ink is shattered or loosened by a particular type of phyiscal action wherein time and temperature are important factors and this preliminary deinking action is consummated by the hydrokinetic action of high velocity submerged jets working on the pulp.

An important object of the invention is a method of deinking waste paper wherein the coarsely pulped waste paper is subjected to an intense, nearly instantaneous, physico-refining step wherein the removal of ink deposits by shattering action and the defibering of the coarse pulp by mechanical action reach maximum efficiency without substantially degrading the fibers, and with the refined pulp being left in a state wherein the deinking may be efficiently consummated by the action of submerged hydraulic jets.

An important object of the invention is apparatus for deinking and reclaiming waste paper which comprises a revolving disk pulp refiner through which the coarse pulp is passed and a scrubber wherein submerged jets of water repeatedly drive into and work on the disintegrated and defibered pulp from many angles as it passes through the scrubber.

Another important object of the invention is a process for, or method of, deinking and reclaiming waste paper of all types wherein the coarsely pulped waste paper is first subjected to a nearly instantaneous disintegrating and defibering treatment which shatters off or loosens practically all of the ink and pigment particles from the fibers, which may be accomplished by passing coarsely pulped waste paper through a high-speed revolving disk refiner typified by the Bauer, Sutherland, and Sprout-Waldron type refiners, and wherein the temperature of the pulp is not allowed to exceed approximately 112° F., and thereafter the disintegrated and defibered pulp is scrubbed or washed at least once in a submerged jet scrubber.

Still another important object of the invention is a process and apparatus wherein waste paper may be deinked and reclaimed without the use of deinking chemicals and wherein the only necessary material for carrying out the process is a supply of cool or cold water which may be re-used in the process after separating out the ink materials, pigments, clays, fillers, sizings and coating materials which are removed during the deinking process.

An important object of the invention is a process for deinking and reclaiming waste paper which does not involve the use of deinking chemicals and in which the waste water from the process may be readily clarified by commercial water treatment apparatus and equipment so that it can either be re-used in the process or sewered without being objectionable from the pollution standpoint.

Another object of the invention is a physico-hydrokinetic process of deinking and reclaiming waste newsprint which does not involve the use of any chemicals and which results in a clean pulp which can be used in large percentages as an extender for groundwood for the production of first quality newsprint.

Another object of the invention is a physico-hydrokinetic process for deinking and reclaiming waste paper without the use of chemicals and for making it into creped towelling of first quality.

Another object of the invention is a physico-hydrokinetic process for deinking and reclaiming waste paper without the use of chemicals so as to manufacture pulp which can be molded into various pulp articles of first quality, such as egg cartons.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a flow diagram illustrating a preferred embodiment of the invention;

Fig. 2 is a side elevational view of a submerged hydraulic jet pulp scrubber mounted on the upper end of an inclined screen washer;

Fig. 3 is a top plan view of the submerged hydraulic jet scrubber shown in Fig. 2;

Fig. 4 is a vertical sectional view taken on line 4—4 of Fig. 3; and

Fig. 5 is a diagrammatic view showing the staggered relation of the jet openings in the opposing upper and lower sets of wash water distributing pipes in the submerged jet scrubber of Figs. 2-4.

On the basis of extensive experimental evidence obtained in connection with the testing and development of the deinking process of the present invention, it was established that printing ink deposits on waste paper are subject to being shattered off from the fibers if the temperatures are maintained sufficiently low. The present invention takes advantage of this basic fact and operates in such a way that the ink and related deposits are thoroughly and efficiently removed, on the one hand, while the strength and character of the fiber are preserved and maintained, on the other. The resulting deinking process of the invention is not a compromise between maximum deinking efficiency, on the one hand, and optimum re-pulping efficiency, on the other, but rather it represents a combination of both of these factors to a most efficient and optimum degree. This is a very important feature of the present invention since it is not practical to have a very efficient and thorough deinking process if it results in a severe loss or degradation of the paper fiber.

The shatterability of printing inks on waste paper may be demonstrated in several ways, but one of the most accurate techniques for evaluating this property involves what we call the "coated wire" test. This particular test was developed especially for use in connection with the evaluation and development of the present deinking process, since the literature on printing inks did not appear to contain any suitable test which could be followed or adopted. In fact, there was no indication in the literature on printing inks or deinking that the shatterability of the printing inks had ever been previously considered or investigated.

In brief, the coated wire technique for testing the shatterability of printing inks at various temperatures involves uniformly coating standard lengths of a soft wire with the particular printing ink being investigated. The lengths of wire are then subjected to accelerated aging by storing at elevated temperatures for suitable periods. If desired, a drier may be added to the inks to accelerate aging. After proper aging, the individual wires are mounted in a special jig wherein one of the ends of the wire is held rigid while the other end projects through a hole in a support block and the outer end is shaped into a crank for twisting the standard length of the wire between the clamped end and the support. After being mounted in such a device, the wire and the device are submerged in a water bath of controlled temperature until the temperature of the wire sample and the jig become equalized with the temperature of the water bath. The crank is then turned while the wire is carefully observed and for this purpose the wire may be brought close to the surface of the water bath. A reading is made as to the fraction of a turn or number of turns that the wire is twisted, i.e. the crank is rotated, before cracks or fissures appear in the ink deposit on the wire surface. This type of test serves to provide an accurate and reproducible determination as to the effect of temperature on the shatterability of any particular ink composition. The following table is representative of the data obtainable by this technique for measuring the shatterability of popular modern printing ink. The data was obtained by applying to pure soft copper wire of approximately 0.080" diameter and polished with jeweler's rouge to provide a clean surface, a black printing ink manufactured by the International Printing Ink Company and designated as Fast Evaporating Black, Vaporin, Y-69338. Some cobalt drier was added beforehand to accelerate aging. The wire was cut in straight lengths 11" long and the individual wires were uniformly coated with the ink composition and then aged for 64 hours in a cabinet at temperatures between 151–161.5° F. At the end of this period the ink films were thoroughly dried and the resins therein had hardened and aged as they do after printing. Each length of wire corresponding to a particular temperature in the table was placed in the jig as described above. The length of wire between the supports was 8½". The jig with one of the wires properly placed therein was immersed in a water bath for 15 minutes at the desired temperature. After 15 minutes the wire was twisted slowly until fissures or cracks developed in the ink.

TABLE I

| Temperature of Water Bath In Which Wires Were Immersed, °F. | Number of Turns Required to Fracture Ink Film |
|---|---|
| 33.8 | ¾ |
| 46.4 | ¾ |
| 66.2 | 1 |
| 82 | 1 |
| 92.2 | 1 |
| 101.5 | 1 |
| 112 | 1½ |
| 122 | 14 |
| 132 | ¹ 30 |

¹ Wire broke before any cracks or fissures appeared in the ink film.

It is evident from the foregoing table that the shatterability of the printing ink was greater at the lower temperatures and decreased gradually on increase in temperature until the range of 112–122° F. was reached. In this range there was a very sharp decrease in the shatterability.

The very marked effect of temperature on shatterability becomes apparent when it is noted, for example, that the ink will commence to shatter upon being twisted one turn only at a temperature of 101.5° F. whereas when the temperature is increased to 132° F., the wire could be twisted 30 turns with no indication of fracture of the ink film thereon.

The data set forth in the foregoing table shows that ink deposits may be shattered or powdered through physical action provided the temperature is maintained sufficiently low, and further, that there is a fairly critical and narrow temperature range above which the ink cannot be removed by a shattering action.

It was not only found that temperature had a critical bearing on the ability to deink waste paper in accordance with the present invention, but that the condition of the fibers or pulp was also very important. Thus, it was found that the hydration of the fibers should be kept to a minimum since it tended to soften the fibers and create a spongy surface condition which lowered the efficiency of the shattering action and greatly increased the difficulty of separating the shattered particles from the fibers. In this connection, it was found that the type of disintegrating or defibering action obtained with a revolving disk type of refiner offered the best method and means for shattering the ink deposits from fibers and at the same time defibering or disintegrating the pulp with a minimum of hydration and degrading action on the fibers. While the fibers are subjected to an extremely intense and violent hydraulic shearing action between the peripheries of the high-speed disks revolving in opposite directions and set to close adjustment, the time involved is so short that the material is discharged the instant the action has been completed to the desired degree.

After leaving such a refiner, the stock is in a condition wherein the ink and related materials can be efficiently and economically removed by means of the intense scrubbing or washing action which is obtainable by means of high-speed submerged hydraulic jets.

In our copending application Serial No. 300,938, filed July 25, 1952, of which the present application is a continuation-in-part, a hydraulic jet scrubber or washer is shown which is a forerunner of the improved submerged jet hydraulic scrubber shown in the accompanying Figs. 2–4. Referring to Figs. 2–4 of the drawings, the reference numeral 5 designates generally a submerged hydraulic jet scrubber or washer for scrubbing or washing paper pulp, particularly the pulp obtained by passing coarse waste paper pulp through a revolving disk type of refiner. The scrubber 5 comprises a sheet metal body having a bottom 6, a top 7, a semi-circular end wall 8, side panels 10 and 11, an inlet or intake compartment 12, and a discharge spout 13 which opens onto a discharge apron having sections 14 and 15.

The intake compartment 12 has a pipe nipple 16 set in the bottom thereof so that stock may be delivered into the compartment 12 from a suitable pipe line. The compartment 12 extends across the full width of the washer 5 at the front end thereof and is provided on the interior with a baffle member 17 which rises from the compartment floor up to a short distance from the top wall thereof. By the time the stream of incoming stock has flowed up through the compartment 12 and over the top edge of the wall or baffle 17, it will have uniformly spread out across the full width of the washer. The stock then flows downwardly between the baffle 17 and a vertical wall 18 which extends down from the top of the compartment 12 and in which is mounted a water distributing pipe 20. A portion of the pipe 20 is disposed interiorly of the compartment 12 and it is provided with a row of holes therealong so that jets of water emerge therefrom in the general direction illustrated in Fig. 4.

Additional water distributing pipes 21—21 are provided in the top wall 7 of the washer while another set of water distributing pipes 22—22 are provided in the bottom wall 6 thereof. It will be seen that the water distributing pipes 21—21 and 22—22 are staggered with respect to each other. Each of the upper pipes 21 has a row of holes in the bottom thereof which discharge jets of water downwardly as indicated in Fig. 4. The lower water distributing pipes 22 likewise have rows of holes in the tops thereof so that they discharge jets of water upwardly as indicated. Referring to Fig. 5, it will be seen that the holes 9—9 in the upper set of pipes 21—21 are staggered in relation to the holes 19—19 in the opposing lower set of pipes 22—22.

An additional water distributing pipe 23 is disposed in the bottom 6 of the washer adjacent the curved end wall 8 thereof and it is provided with a row of openings therein so as to discharge water jets against the middle of the end wall, as indicated.

The ends of the water distributing pipes 20 and 21—21 project outside the side wall 11 and connect with a water manifold or header 24. Similarly, the ends of the bottom water distributing pipes 22—22 and 23 project through the side panel 11 and are connected with a water distributing manifold or header 25. Water under high pressure (e.g. 150–200 p.s.i.) is delivered into the manifold 24 through a nipple 26 on the outside thereof and water under pressure is admitted to the lower manifold 25 through a nipple 27 on the side thereof. The nipples 26 and 27 may be connected with the discharge side of a high pressure pump.

The top of the scrubber 5 may be provided with an inspection riser 28 having a removable cover 30 provided with a handle 31. The cover 30 may be removed from time to time in order to visually inspect the scrubbing or washing action as the stock flows through the scrubber 5.

The discharge spout 13 has a flat roof 32 and an upwardly inclined floor 33. The discharge opening of the spout 13 is indicated at 34 and is in the form of a narrow horizontal slot which extends crosswise of the scrubber 5 and opens out onto the apron section 14.

The scrubber 5 is supported on the upper end of an inclined screen or side-hill washer indicated generally at 35 comprising a screen 36 and a drain board 37. The scrubber 5 is supported on legs 38 so that the downwardly tilted apron section 15 discharges onto the upper end of the screen 36.

The consistency of the stock as it is introduced into the scrubber 5 is relatively low and may be in the range of 2–3%. As the stock passes through the scrubber, it is subjected to an intense scrubbing or washing action from the multitudinous individual submerged water jets striking it at the most efficient angles. These jets serve not only to de-flocculate or disperse the fiber in the water carrier medium, but the intense churning action obtained on the interior of the scrubber 5 serves to consummate the defibering and deinking actions commenced and largely carried out in the revolving disk refiner. When the stock is discharged from the scrubber 5 out onto the upper end of the side-hill washer or inclined screen, the pulp fibers are highly dispersed and most of the ink particles and various sizing and coating materials such as clays and starch are largely separated and free from the fibers. Normally two passes through the scrubber 5 will thoroughly clean the pulp and consummate the deinking and repulping process.

Reference may now be had to Fig. 1 of the drawings for a description of a preferred method and apparatus for practicing the invention making use of two scrubbers corresponding to the scrubber 5 described above in connection with Figs. 2–4. The waste paper is first introduced into a coarse pulper or fiberizer which may be either a batch type beater or a continuous type beater, a so-called "Hydro-pulper," or any other suitable piece of equipment for forming the waste paper into a coarse pulp which can be pumped through the system to the refiner. The water for the coarse pulper need not be particularly clean although the cleaner and the cooler the water is the better the results will tend to be. Preferably, the coarse pulper is one that operates continuously. If a batch-type beater is used, then a holding chest for the coarse pulp should be provided from which it may be drawn and fed into the refiner.

The type of refiner which has given the optimum results is a revolving disk refiner, such as described, for example, in the above mentioned U.S. Patents Nos. 1,744,226 and 2,568,783. The modern forms of these revolving disk refiners, such as the Bauer, Sutherland, and Sprout-Waldron refiners, are highly efficient. However, the process has been satisfactorily conducted in other models of these machines and in models wherein one of the disks is stationary and the other is driven. However, it may be necessary in the older and less efficient models of these revolving disk refiners to pass the pulp through twice whereas in the recent models, only one pass is required. The pulp passes through one of these refiners in the matter of a few seconds, e.g. one to five seconds, and the pulp is in the peripheral portion where most of the disintegrating and defibering takes place only for a second or so, so that the disintegrating and defibering action may be said to be almost or practically instantaneous.

After passing through the refiner, the pulp is next delivered to a submerged hydraulic jet scrubber, such as the scrubber 5 shown and described above in connection with Figs. 2–4. This scrubber will be located at the top of a side-hill type washer comprising a metal screen underneath which is provided a drain board for conveying the water which drains through this screen down into a suitable collecting sump. The wash water is delivered into the scrubber under high pressure, e.g. in the order of 150–250 p.s.i. As the wet stock is delivered out onto the screen, the water drains through the screen and the pulp rolls down the screen in small bundles or clumps. The pulp runs off the end of the screen into a chest where wash water from the following side-hill water washer may be introduced so as to reslurry the pulp to the proper consistency for introduction into a second submerged jet scrubber.

The drain or wash water from the first side-hill washer which will be laden with ink and pigment particles, clays, starches, etc. is withdrawn to a clarifier. Preferably, the clarifier or settler is of a type which does not require the use of any chemicals. Usually the settling properties of the wash water are sufficiently good that a large settling tank will be adequate for this purpose. High capacity centrifuges may be used if desired for clarifying the wash water. The supernatant or clear water is withdrawn from the clarifier and recirculated to the coarse pulper and to the second submerged jet scrubber. There is some water lost in the process and the make-up water may be added to the stream of recirculated clean water which goes to the high pressure pumps serving the second submerged jet scrubber.

After the pulp leaves the second submerged jet scrubber and runs down the second side-hill washer, it will be substantially free of ink deposits and related materials, such as clays, fillers, starch, etc. This pulp is clean and white and may be withdrawn as necessary from the chest at the bottom of the second side-hill washer and passed through a Jordan prior to being delivered into the head box of a Fourdrinier paper machine.

It will be appreciated that a number of variations may be made in the details of the process and apparatus illustrated in the flow diagram of Fig. 1. However, it is essential that the waste paper be coarsely pulped in some manner, then subjected to a disintegrating and defibering action, such as obtained with the revolving disk type refiners, and then washed at least once while in a dispersed condition and preferably with high-speed submerged hydraulic jets of wash water.

Chemicals are not needed and should not be used in carrying out the process. Only cool or cold water should be used. The temperature of the coarse pulp in the refiner must be maintained below the critical temperature range whereat and above which the ink cannot be efficiently shattered and separated from the fibers.

Considerable quantities of various types and grades of paper have been made from waste paper which has been deinked and reclaimed in accordance with the present invention, and the following examples will serve further to illustrate the nature and scope of the invention.

EXAMPLE 1

A batch of waste paper was introduced into a batch-type beater supplied with cold water having a temperature of 62° F. with no chemical being added thereto. The batch consisted of 3 parts of commercial Printed News (rotogravure sections, colored comics and colored news omitted) and 1 part of Life magazine. The newspapers ranged from 6 months to several years old. The temperature of the stock in the beater rose to about 66° F. and remained constant during 20 minutes required to coarsely pulp the stock. At the end of the beating operation the stock had a consistency of 3.25% and a freeness of 335 (Canadian Standard).

The stock from the beater was dropped into a holding chest and pumped from there into a Bauer refiner having a set of 36" disks revolving in opposite directions. The setting of this Bauer mill was minus (—0.005"). The temperature of the stock entering the Bauer was 64° F. and the temperature on leaving was 92° F.—a rise of 28° F. on passage through the Bauer. The consistency of the stock leaving the Bauer was 2.45% and had a freeness of 125 (C.S.).

After one pass through the Bauer, the stock was pumped to a submerged jet scrubber corresponding to the scrubber 5 described above in connection with Figs. 2–4. Wash water was delivered to the headers 24 and 25 at a pressure of 165 p.s.i. and at a rate of 28.5 gallons per minute. The stock was put through the scrubber at a rate of from 250–300 pounds of dry fiber per hour. The consistency of the stock at the bottom of the inclined screen after the first wash was 2.86% and the freeness was 255 (C.S.). The once washed stock was again washed by passage through the submerged jet-type scrubber and then down the side-hill or inclined screen washer. The consistency of the stock at the bottom of the second inclined screen was 2.96% and the freeness was 480 (C.S.).

The yield of deinked and reclaimed pulp as obtained at the bottom of the second inclined screen was 56% of the original quantity of waste paper which was assumed to contain 5% moisture.

The deinked and reclaimed stock obtained from the 100% waste paper (75% printed news and 25% Life magazine) was made into towelling and newsprint on a Fourdrinier paper machine. In machine run No. 4042 the stock was made into satisfactory towelling by setting the machine for creping at the first press roll. The results of this machine run and of the additional machine runs mentioned below are tabulated in the table at the end of Example 2.

After machine run No. 4042, 25% bleached (new) groundwood was added to the remainder of the old paper furnish. In machine run No. 4043, towelling was again made and a satisfactory product obtained as shown by the data contained in the following table.

The remainder of the stock (containing 75% deinked old paper and 25% bleached groundwood) was made into newsprint. The creping doctor was raised at the first press and the Jordan was used. In machine run No. 44, the stock was made into paper having standard news weight and as nearly as possible to a standard news finish. In machine run No. 4045, 7.5% clay filler and ½% rosin sizing was added to the furnish in the chest. During this latter run, Rhodamine and Brilliant Paper Yellow were added prior to the head box in various proportions. The final part of run No. 4045 produced very satisfactory newsprint.

EXAMPLE 2

This example was directed to the deinking of old general magazine stock and the manufacture of various types of paper therefrom. Two 100 pound batches of old magazine paper stock was used as received commercially. A list of the magazines introduced into the beater was recorded as follows:

McCalls
Saturday Evening Post
Seventeen
Colliers
Ladies Home Journal
Better Homes & Gardens Woman's Home Companion
American Home
Companion
Popular Mechanics
Life Each 100 pound batch of the old magazines was coarsely pulped in a beater. In the first batch the beater stock temperature was 62° F., the consistency 4.65%, and freeness 500 (C.S.). For the second batch, the beater stock temperature was 60° F.

The coarsely pulped stock was passed through the 36" Bauer used in Example 1 with the same setting, i.e. minus (—) 0.005". The temperature of the stock entering the Bauer was 61° F. and the consistency was 2.4%. The temperature of the stock leaving the Bauer was 87.5° F. and the freeness was 170 (C.S.).

per without surface coating and in run No. 4051 the same stock was made into offset paper with the size press in operation and adding the starch clay sizing to the surface.

The results of the foregoing machine runs Nos. 4042 through 4051 of Examples 1 and 2 are set forth in the following table:

TABLE 2

*Data obtained on the experimental papers*

TOWELING PAPERS

| Machine run No. | Furnish | Surface coated | Basis weight (25 x 40 –500), lb. | Thickness, mils | Density, gm. per cc. | Bursting strength | | Average tearing resistance | | Average tensile strength, p.i.w. | Smoothness, (Bakk), sec. per 20 mm. | Brightness, G.E. equivalent | Opacity, percent | Stretch crepe direction, percent | Water absorbency; sec. per 0.1 ml. |
|---|---|---|---|---|---|---|---|---|---|---|---|---|---|---|---|
| | | | | | | pts. | Pts. per lb. per rm. | Gm. | Gm. per lb. per rm. | | | | | | |
| 4042 | 100% deinked wastepaper. | No | 44.3 | | | 7.4 | 0.17 | 26.2 | 0.59 | 3.3 | | | | 16.9 | 35 |
| 4043 | 75% deinked wastepaper, 25% new groundwood. | No | 45.6 | | | 9.3 | .20 | 30.8 | .68 | 4.0 | | | | 13.9 | 28 |

NEWSPRINT PAPERS

| 4044 | 75% deinked wastepaper, 25% new groundwood. | No | 37.3 | 4.1 | 0.50 | 7.9 | .21 | 23.1 | .61 | 6.8 | | 51.9 | 95.2 | | |
| 4045 [1] | ...do... | No | 40.9 | 3.9 | .58 | 9.0 | .22 | 19.8 | .48 | 7.8 | | 58.6 | 96.6 | | |

OFFSET PAPERS

| 4046 | 100% deinked magazine. | No | 55.0 | 4.3 | .71 | 14.3 | .26 | 55.9 | 1.01 | 11.7 | | 65.5 | | | |
| 4047 | ...do... | Yes | 65.7 | 4.4 | .83 | 25.5 | .39 | 65.2 | .98 | 21.5 | 32 | 65.8 | 95.5 | | |
| 4048 | 75% deinked magazine, 25% new groundwood. | No | 56.9 | 4.5 | .70 | 20.5 | .36 | 47.8 | .84 | 18.3 | | 63.5 | | | |
| 4049 | ...do... | Yes | 64.0 | 4.5 | .79 | 25.8 | .40 | 51.4 | .81 | 23.2 | 28 | 64.6 | 95.9 | | |
| 4050 | 75% deinked magazine, 25% bleached sulfate. | No | 52.5 | 4.4 | .66 | 20.0 | .38 | 71.1 | 1.34 | 16.8 | | 67.3 | | | |
| 4051 | ...do... | Yes | 65.0 | 4.7 | .76 | 34.2 | .52 | 74.0 | 1.13 | 26.8 | 16 | 67.2 | 93.3 | | |

[1] 7.5 percent clay filler.

The refined stock after passing through the Bauer was twice washed in the submerged hydraulic jet scrubber and after each passed through the scrubber, was discharged onto the upper end of the inclined screen washer. The second washer stock was a very good appearing pulp which was clean and white. The yield of the deinked stock based on the weight of the dry waste paper was 49%.

Six machine runs were made with this deinked and reclaimed magazine stock as follows:

In machine run No. 4046, 100% of the deinked magazine stock, rosin sized at 1%, was made into offset paper having a finish of about that of regular offset book paper. In run No. 4047, the 100% magazine furnish with 1% rosin size was coated in the size press with a starch clay coating and a satisfactory offset paper obtained.

The remaining portion of the 100% magazine furnish was divided into two parts and into one of them there was added 25% bleached (new) groundwood with no coloring or filler being added. To the remaining portion there was added 25% bleached kraft (sulfate) pulp with no coloring or filler. In machine run No. 4048, the 75% old magazine stock—25% new groundwood was made into offset paper with about regular offset finish. In machine run No. 4049, the size press was operated so as to deposit a light weight coating of starch and clay to the paper.

In machine run No. 4050, the 75% deinked machine stock and 25% bleached sulfate was made into offset paper without surface coating and in run No. 4051 the same stock was made into offset paper with the size press in operation and adding the starch clay sizing to the surface.

A sample of the wash water obtained at the bottom of the inclined screen washer from the first washing of the 100% waste magazine stock was collected in Example 2 and assayed for B.O.D. (biochemical oxygen demand) values. A part of the sample was centrifuged and the clear supernatant solution was separated from the mixed waste and sludge. Several B.O.D. determinations were made on each specimen in order to obtain a reliable average in each case. Because of the fast settling properties of the sludge, there was a much greater spread in the individual determinations made thereon than was the case with the determinations made on the clear supernatant solution which were quite close to each other. The average B.O.D. values obtained were as follows:

P.p.m. B.O.D.
Clear—supernatant waste _____ 90.2
Mixed waste and sludge _____ 654

For purposes of evaluation and comparison, the foregoing B.O.D. values may be compared with the following B.O.D. values for the various materials or fluids indicated:

P.p.m. B.O.D.
Spent sulfite liquor _____ About 29,000
Wisconsin River water (Port Edwards) __ About 8
Typical paper machine white water _____ 25–90

A B.O.D. value of 90 sufficiently low that the clarified wash water from the present deinking process may be safely sewered into most rivers or streams.

Having fully described our invention and set forth presently preferred embodiments thereof by way of illustration, those skilled in the art will be able to practice the invention by following such embodiments as described or by making minor and obvious modifications therein.

This application is a continuation-in-part of our co-pending applications Serial No. 263,965, filed December 28, 1951, now abandoned, and Serial No. 300,938, filed July 25, 1952.

What is claimed as new is:

1. The method of deinking waste paper in cool or cold water without cooking and use of deinking chemicals, so as to reclaim a large percent of the fiber content as clean pulp suitable for re-use in papermaking, comprising, coarsely pulping waste paper in cool or cold water, refining the resulting coarse pulp slurry by passing it at least once through a revolving disk refiner in a few seconds while maintaining the temperature of the pulp below about 112° F. so as to shatter the ink from the fibers, said refiner having closely set opposed refining surfaces having a relative speed of at least several thousand feet per minute to produce an intense refining and shattering action, subjecting an enclosed stream of the resulting slurry of refined pulp to the action of a plurality of submerged jets of wash water so as to intensely agitate the slurry stream and disperse the fibers and shattered ink particles throughout the water vehicle without dewatering and with a substantial lowering of the consistency, and then dewatering the slurry so as to separate the ink particles from the fibers.

2. The method of deinking waste paper in cool or cold water without cooking and use of deinking chemicals, so as to reclaim a large percent of the fiber content as clean pulp suitable for re-use in papermaking, comprising, converting printed waste paper into coarse pulp in cool or cold water, subjecting the resulting coarse pulp slurry at an initial temperature not in excess of about 70° F. to the intense refining and shattering action of a revolving disk pulp refiner for not more than about 5 seconds while maintaining the temperature of the pulp below about 112° F., said refiner having closely set opposed refining disk surfaces having a relative speed of at least several thousand feet per minute, at least once washing the slurry of refined pulp by introducing into an enclosed freely flowing stream thereof a plurality of high velocity jets of wash water so as to intensely agitate the slurry stream and disperse the fibers and shattered ink particles throughout the water vehicle without dewatering and with a substantial lowering of the consistency, and then dewatering the slurry so as to separate the ink particles from the fibers.

3. The method of deinking waste paper in cool or cold water without cooking and use of deinking chemicals, so as to reclaim a large percent of the fiber content as clean pulp suitable for re-use in papermaking, comprising, converting printed waste paper into coarse pulp in cool or cold water, subjecting the resulting coarse pulp slurry at an initial temperature not in excess of about 70° F. to the intense refining and shattering action of a revolving disk pulp refiner for not more than about 5 seconds while maintaining the temperature of the pulp below about 112° F., said refiner having closely set opposed refining disk surfaces having a relative speed of at least several thousand feet per minute, at least once washing the slurry of refined pulp by introducing into an enclosed freely flowing stream from opposite sides thereof a plurality of high velocity jets of wash water so as to intensely agitate the stream of slurry and disperse the fibers and shattered ink particles throughout the water vehicle without dewatering and with a substantial lowering of the consistency, and dewatering the washed slurry by delivering it onto the upper end of an inclined screen through which the water vehicle carrying ink particles and fines drains while the pulp rolls down.

4. The method of deinking waste paper in cool or cold water without cooking and use of deinking chemicals so as to reclaim a large portion of the fiber content as clean pulp suitable for use in papermaking, which comprises, coarsely pulping waste paper in cool or cold water, processing the resulting coarse pulp slurry between opposed closely set serrated refining surfaces traveling at a high relative speed in the order of at least several thousand feet per minute so as to shatter the ink particles from the fibers in an intense refining action, removing the refined pulp from said refining surfaces in a few seconds and at a temperature below 112° F., conducting an enclosed stream of the resulting slurry of refined pulp in a free condition past a plurality of submerged high velocity jets of wash water directed into said stream so as to intensely agitate the slurry stream and disperse the fibers and shattered ink particles throughout the water vehicle without dewatering and with a substantial lowering of the consistency, and then dewatering the slurry so as to separate the ink particles from the fibers.

5. The method of claim 4 wherein the relative speed of said refining surfaces is approximately eighteen thousand feet per minute and the pulp is removed from said refining surfaces in not more than about five seconds.

References Cited in the file of this patent

UNITED STATES PATENTS

| | | |
|---|---|---|
| 807,228 | Wurster | Dec. 12, 1905 |
| 995,898 | Petsche | Apr. 26, 1910 |
| 1,026,577 | Hahnle | May 14, 1912 |
| 1,026,578 | Hammond | May 14, 1912 |
| 1,984,869 | Farley | Dec. 18, 1934 |
| 2,355,243 | Scheid | Aug. 8, 1944 |
| 2,394,182 | Inglis | Feb. 5, 1946 |
| 2,442,990 | Wells | June 8, 1948 |
| 2,641,164 | Hill | June 9, 1953 |

FOREIGN PATENTS

| | | |
|---|---|---|
| 258,630 | Great Britain | Sept. 24, 1926 |

OTHER REFERENCES

Pulp and Paper Manufacture, volume 2, published by McGraw-Hill, N.Y., in 1951, pp. 138, 159, 167 and 180.

Casey: Pulp and Paper, volume 1, published by Interscience, N.Y., in 1952, p. 325.

UNITED STATES PATENT OFFICE

CERTIFICATE OF CORRECTION

Patent No. 2,916,412                  December 8, 1959

Norman A. Altmann et al.

It is hereby certified that error appears in the printed specification of the above numbered patent requiring correction and that the said Letters Patent should read as corrected below.

Column 14, list of references cited, under the heading "UNITED STATES PATENTS", for patent number "995,898" read -- 955,898 --.

Signed and sealed this 21st day of June 1960.

(SEAL)
Attest:

KARL H. AXLINE
Attesting Officer

ROBERT C. WATSON
Commissioner of Patents